Dec. 25, 1951 V. L. KING 2,580,104
FISHING LURE
Filed June 9, 1950

INVENTOR.
Virgil L. King
BY Patrick D. Beavers
Attorney

Patented Dec. 25, 1951

2,580,104

UNITED STATES PATENT OFFICE 2,580,104

FISHING LURE

Virgil L. King, El Dorado, Kans.

Application June 9, 1950, Serial No. 167,110

4 Claims. (Cl. 43—42.23)

The present invention relates to a fishing lure and it consists in the combinations, constructions and arrangements of parts herein described and claimed.

Generally the invention comprises a fishing lure having a body formed of wood or other suitable material and provided upon its upper rearward side with an eye to which is attached a forwardly extending leader. A plate is affixed to the underside of the body and has formed integrally therewith a curvular vane which extends forwardly of the body and which is concave upon its upper face to form a continuation of a channel which extends longitudinally forwardly and downwardly in the body from a point adjacent the eye to which the leader wire is attached. A chain is affixed to the forward end of the vane and the leader wire extends through the upper end of the chain. Fish hooks are attached at the rearward end of the plate which extends approximately midway of the underside of the body. The peculiar construction of the device forming this invention is such that it imparts a wobbling motion to the same when it is drawn through water particularly due to the fact that the anchoring eye for the leader wire is at the rearward end of the body of the device.

It is accordingly an object of the invention to provide a device of the character described which is simple in construction, inexpensive to manufacture and yet effective and efficient in use.

Another object of the invention is the provision of a fishing lure wherein the conventional leader wire is attached adjacent the rearward end of the same.

Another object of the invention is the provision, in a device of the character set forth, of a novel guiding chain forming a part of the invention.

A further object of the invention is the provision, in a device of the character set forth of a novel vane and body channel both forming parts of the invention.

Other and further objects of the invention will become apparent from a reading of the following specification taken in conjunction with the drawing, in which.

Figure 1:
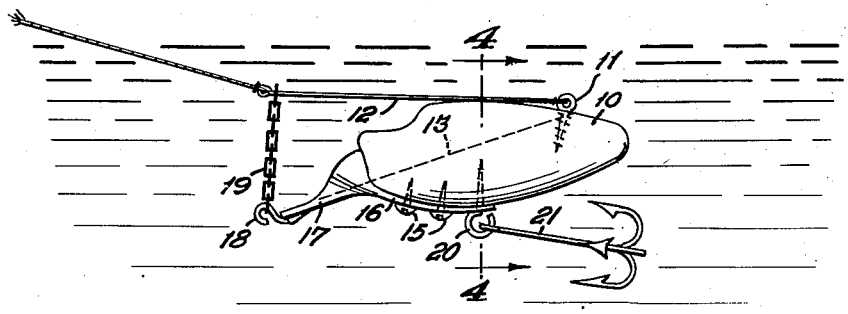
Figure 1 is a side elevational view of an embodiment of the invention.
Figure 2:
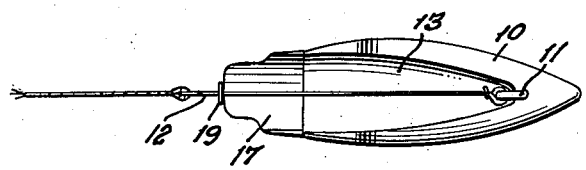
Figure 2 is a top plan view thereof.
Figure 3:
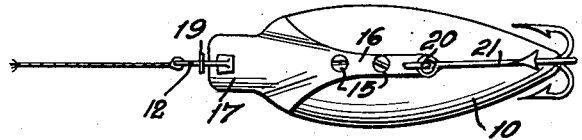
Figure 3 is a bottom plan view of the device shown in Figures 1 and 2.
Figure 4:
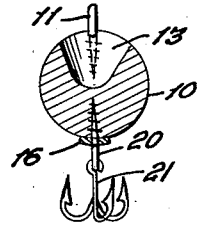
Figure 4 is a sectional view taken along line 4—4 of Figure 1 without the leader wire shown.

Referring more particularly to the drawing, there is shown therein a fishing lure having a substantially ovular-shaped body 10 to the upper rearward side of which is affixed an eye 11 which forms an anchor for a forwardly extending leader wire 12.

Extending forwardly and downwardly from a point adjacent the eye 11 there is formed in the upper side of the body 10 a channel 13 and to the forward underside of the body 10 there is affixed by screws 15 or the like a plate 16 having integrally formed therewith a forwardly and downwardly extending vane 17 which is curvular in cross sectional area and which presents a concave face uppermost, such concave face forming a substantial continuation of the channel 13.

An eye 18 is mounted at the forward edge of the vane 17 and the lower end of a chain 19 is affixed to the eye 18 while the leader wire 12 extends through the upper end of the chain.

An eye 20 is affixed centrally upon the bottom of the body 10 and, as shown, also extends through the rearward end of the plate 16. A fish hook 21 is connected to the eye 20 and, in the present case, is shown as being of the multi-pronged type.

In operation, it will be apparent that as the device is drawn through the water, since the center of gravity of the device lies forwardly of its anchoring eye 11, there will be a tendency for the device to move from one side to the other due to the natural tendency to restore the center of gravity to a position rearward of the eye 11 to which the leader wire 12 is attached. The device is assisted in this movement by the passage of water through the concave portion of the vane 17 and the channel 13 but is restrained from such movement by the chain 19 since the latter is connected to the leader wire 12. However, since the leader wire 12 and the chain 19 are both of a flexible nature, it will be apparent that all the movements of the device will follow a highly erratic course thus providing a variety of movements to the same and presenting an extremely lifelike appearance to fish in the neighborhood.

While but one form of the invention has been shown and described herein, it will be readily apparent to those skilled in the art that many minor modifications may be made without departing from the spirit of the invention or the scope of the appended claims.

What is claimed is:

1. A device of the character described comprising an elongated horizontally extending body, a vane affixed to said body and extending forwardly thereof, a leader wire attached to said body adjacent the rear end thereof and a chain interconnecting the forward end of said vane and said leader wire.

2. A device of the character described comprising an elongated horizontally extending body, a vane affixed to said body and extending forwardly thereof, a leader wire attached to said body adjacent the rear end thereof, and a chain interconnecting the forward end of said vane and said leader wire, said body having a forwardly and downwardly extending channel in the upper side and said vane being concave on its upper face and forming a continuation of said channel.

3. A device of the character described comprising an elongated horizontally extending body, a plate affixed to the underside of said body, a vane formed integrally with said plate and extending forwardly and downwardly from said body, an eye affixed to the upper side of said body adjacent the rearward end thereof, a leader wire attached to said eye and extending forwardly therefrom, and a chain interconnecting the forward end of the vane at its lower end and receiving the leader wire therethrough at its upper end.

4. A device of the character described comprising an elongated horizontally extending body, a plate affixed to the underside of said body, a vane formed integrally with said plate and extending forwardly and downwardly from said body, an eye affixed to the upper side of said body adjacent the rearward end thereof, a leader wire attached to said eye and extending forwardly therefrom, and a chain interconnecting the forward end of the vane at its lower end and receiving the leader wire therethrough at its upper end, said body having a forwardly and downwardly extending channel in its upper side, and said vane being concave on its upper face and forming a continuation of said channel.

VIRGIL L. KING.

REFERENCES CITED

The following references are of record in the file of this patent:

UNITED STATES PATENTS

| Number | Name | Date |
| --- | --- | --- |
| 1,490,161 | Dickman | Apr. 15, 1924 |
| 1,840,273 | Lang | Jan. 5, 1932 |
| 2,249,770 | McArthur | July 22, 1941 |
| 2,327,789 | Hixon | Aug. 24, 1943 |
| 2,503,369 | Wycech | Apr. 11, 1950 |